United States Patent
Li et al.

(10) Patent No.: US 10,435,286 B2
(45) Date of Patent: Oct. 8, 2019

(54) INTELLIGENT LIQUID DISPENSING SYSTEM

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Bai-Miao Li, Shenzhen (CN); Shun-Chuan Yang, New Taipei (TW)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 110 days.

(21) Appl. No.: 15/495,951

(22) Filed: Apr. 24, 2017

(65) Prior Publication Data

US 2018/0257921 A1    Sep. 13, 2018

(30) Foreign Application Priority Data

Mar. 13, 2017    (CN) .......................... 2017 1 0145875

(51) Int. Cl.
| | |
|---|---|
| *B67D 1/08* | (2006.01) |
| *A47K 5/12* | (2006.01) |
| *G07F 13/06* | (2006.01) |
| *G06Q 50/12* | (2012.01) |
| *B67D 1/00* | (2006.01) |
| *G06Q 20/12* | (2012.01) |

(Continued)

(52) U.S. Cl.
CPC .......... *B67D 1/0888* (2013.01); *A47K 5/1217* (2013.01); *B67D 1/0011* (2013.01); *G06Q 20/127* (2013.01); *G06Q 20/145* (2013.01); *G06Q 50/12* (2013.01); *G07F 13/065* (2013.01); *G07F 15/04* (2013.01)

(58) Field of Classification Search
CPC ... B67D 1/0888; B67D 1/0011; G07F 13/065; A47K 5/1217; G06Q 50/12
USPC .......................................................... 700/281
See application file for complete search history.

(56) References Cited

U.S. PATENT DOCUMENTS

2005/0269337 A1* 12/2005 McGrath ................ B65D 47/06
220/717
2013/0259903 A1* 10/2013 Mortenson ............ B22F 1/0022
424/400

(Continued)

FOREIGN PATENT DOCUMENTS

| CN | 105184975 | 12/2015 |
|---|---|---|
| CN | 106297020 | 1/2017 |

*Primary Examiner* — Ziaul Karim
(74) *Attorney, Agent, or Firm* — ScienBiziP, P.C.

(57) ABSTRACT

A liquid dispensing apparatus able to dispense liquid suitable for dispensor or as input according to desire of dispensor includes a liquid outlet, a valve, a liquid customizing module, a storage module, a determining module, a time calculating module, and a controlling module. The storage module stores rules as to liquid dispensable and a flow speed of liquid. According to the rules, the determining module determines liquid suitable for a dispensor or to answer an input requirement. According to the flow speed and dispensable amount, the time calculating module calculates a time for the liquid to flow. When preset condition is met, the controlling module turns the valve on. When a flow time of the liquid is reached, the controlling module turns the valve off.

18 Claims, 7 Drawing Sheets

(51) Int. Cl.
*G06Q 20/14* (2012.01)
*G07F 15/04* (2006.01)

(56) References Cited

U.S. PATENT DOCUMENTS

2015/0305967 A1* 10/2015 O'Neal .................. A61H 15/00
  601/117
2015/0315008 A1* 11/2015 Locke .................. B67D 1/1279
  222/52
2016/0368752 A1* 12/2016 Bethuy ............... A47J 31/4403
2016/0368753 A1* 12/2016 Bethuy ............... B67D 1/0025

* cited by examiner

INTELLIGENT LIQUID DISPENSING SYSTEM

CROSS-REFERENCE TO RELATED APPLICATIONS

This application claims priority to Chinese Patent Application No. 201710145875.4, filed on Mar. 13, 2017, the contents of which are incorporated by reference herein.

FIELD

The subject matter herein generally relates to systems dispensing liquids.

BACKGROUND

Hands under a liquid outlet of an apparatus causes liquid to flow out from the liquid outlet. The liquid is determined by a time of the hands placed under the liquid dispenser. The amount of the liquid may be more or less than the person needs.

BRIEF DESCRIPTION OF THE DRAWINGS

Implementations of the present technology will now be described, by way of example only, with reference to the attached figures.

DETAILED DESCRIPTION

Figure 1:
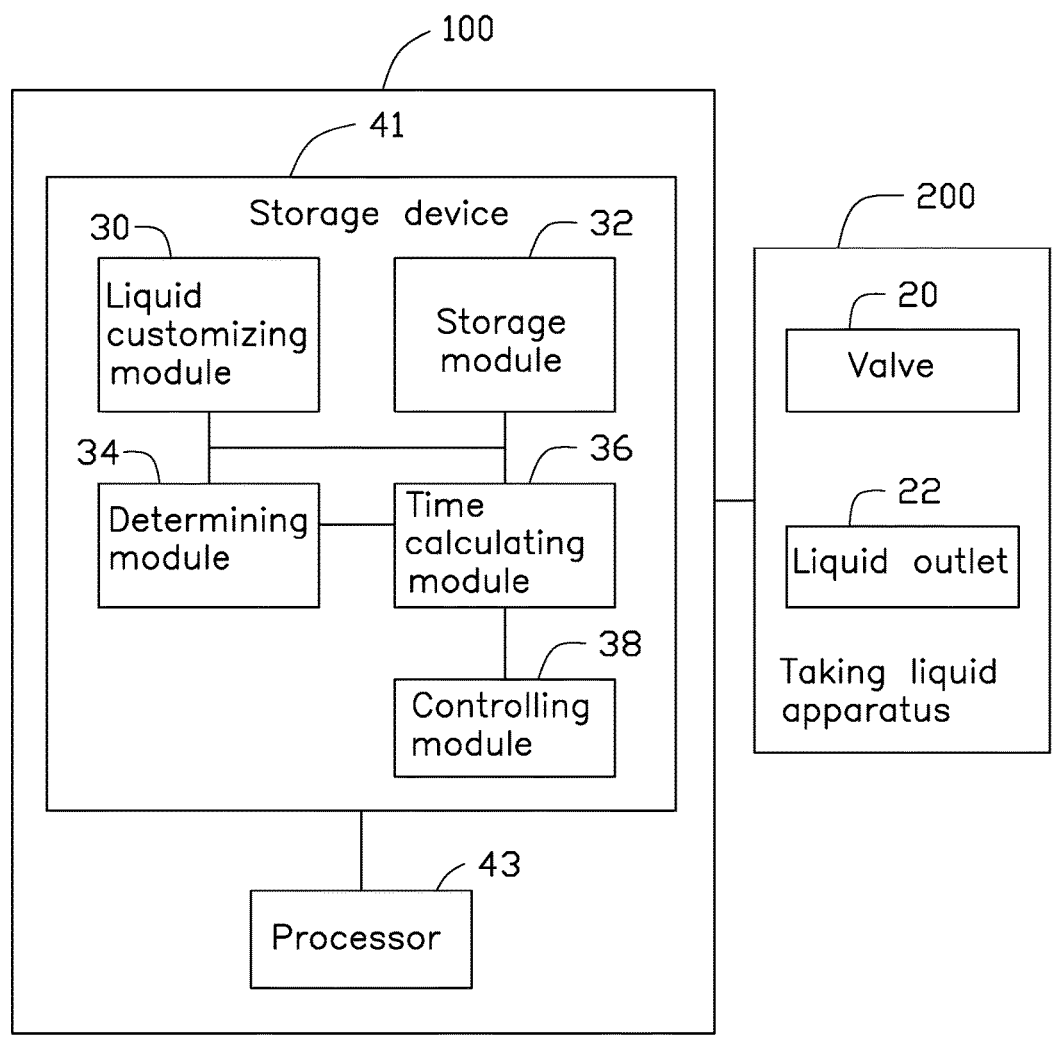
FIG. 1 is a block diagram of an intelligent liquid dispensing system according to a first exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the exemplary embodiments described herein.

A definition that applies throughout this disclosure will now be presented.

The term "comprising" means "including, but not necessarily limited to"; it specifically indicates open-ended inclusion or membership in a so-described combination, group, series, and the like.

FIG. 1 illustrates an intelligent liquid dispensing system 100. The intelligent liquid dispensing system 100 controls a liquid-releasing apparatus 200 to discharge liquid corresponding to a user's need. The liquid-releasing apparatus 200 includes a valve 20 and a liquid outlet 22. The valve 20 controls liquid flowing out of the liquid outlet 22. The intelligent liquid dispensing system 100 includes a storage device 41 and a processor 43. The storage device 41 stores programs of a liquid customizing module 30, a storage module 32, a determining module 34, a time calculating module 36, and a controlling module 38. The processor 43 calculates and processes various types of data of the programs in the storage device 41.

Figure 2:
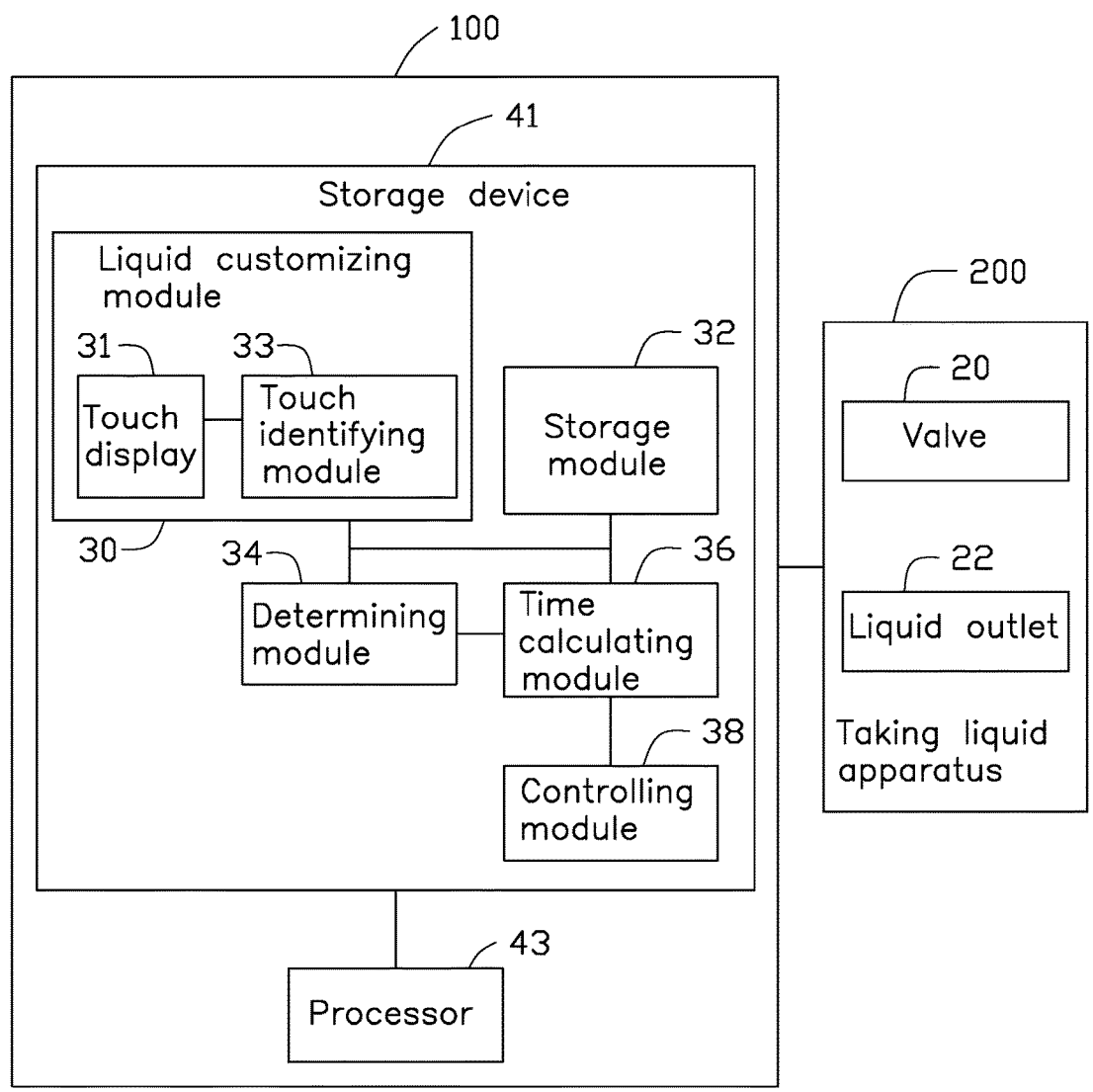
FIG. 2 is a block diagram of a liquid customizing module of the intelligent liquid dispensing system in FIG. 1, according to an exemplary embodiment.
Figure 3:
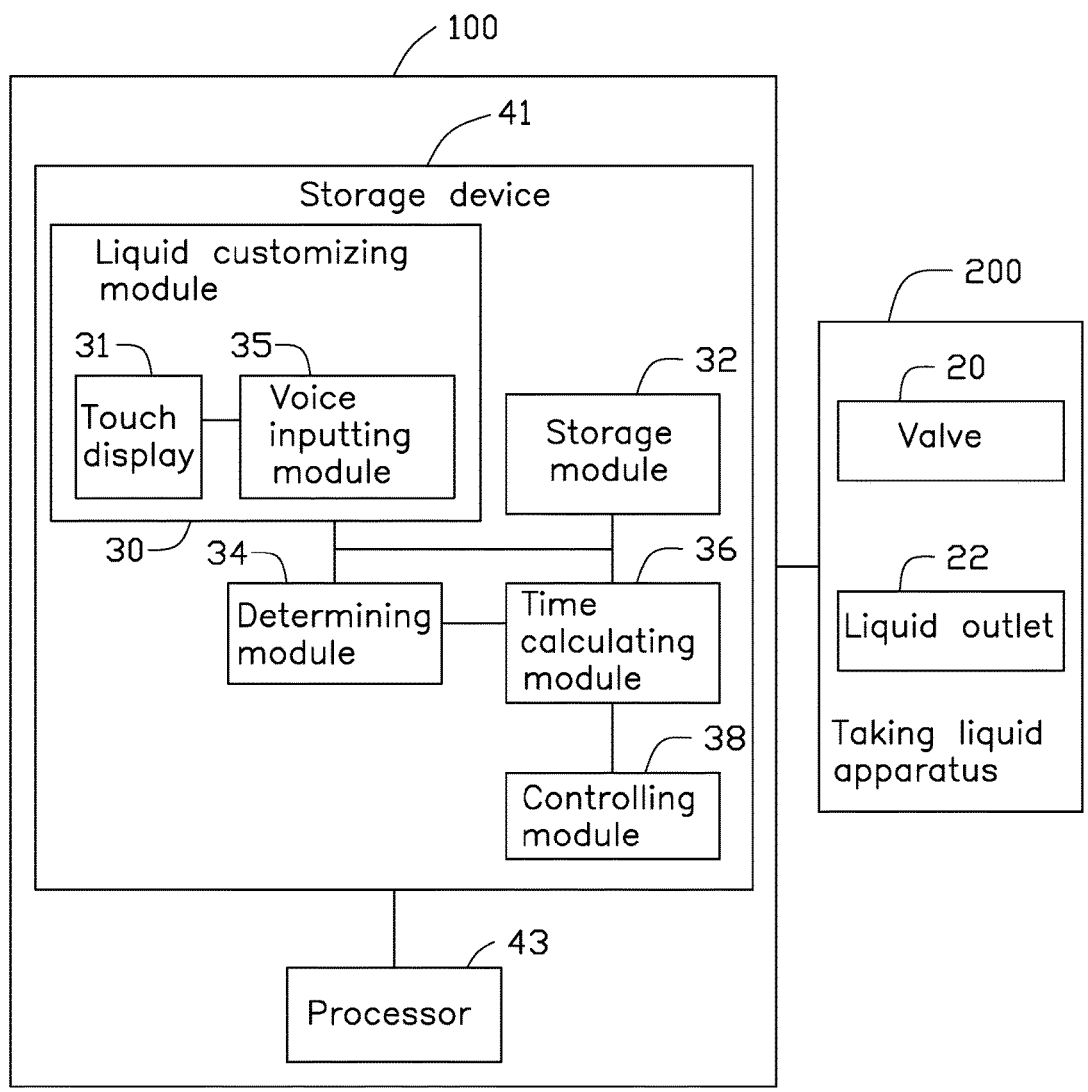
FIG. 3 is a block diagram of a liquid customizing module of the intelligent liquid dispensing system in FIG. 1, according to another exemplary embodiment.
Figure 4:
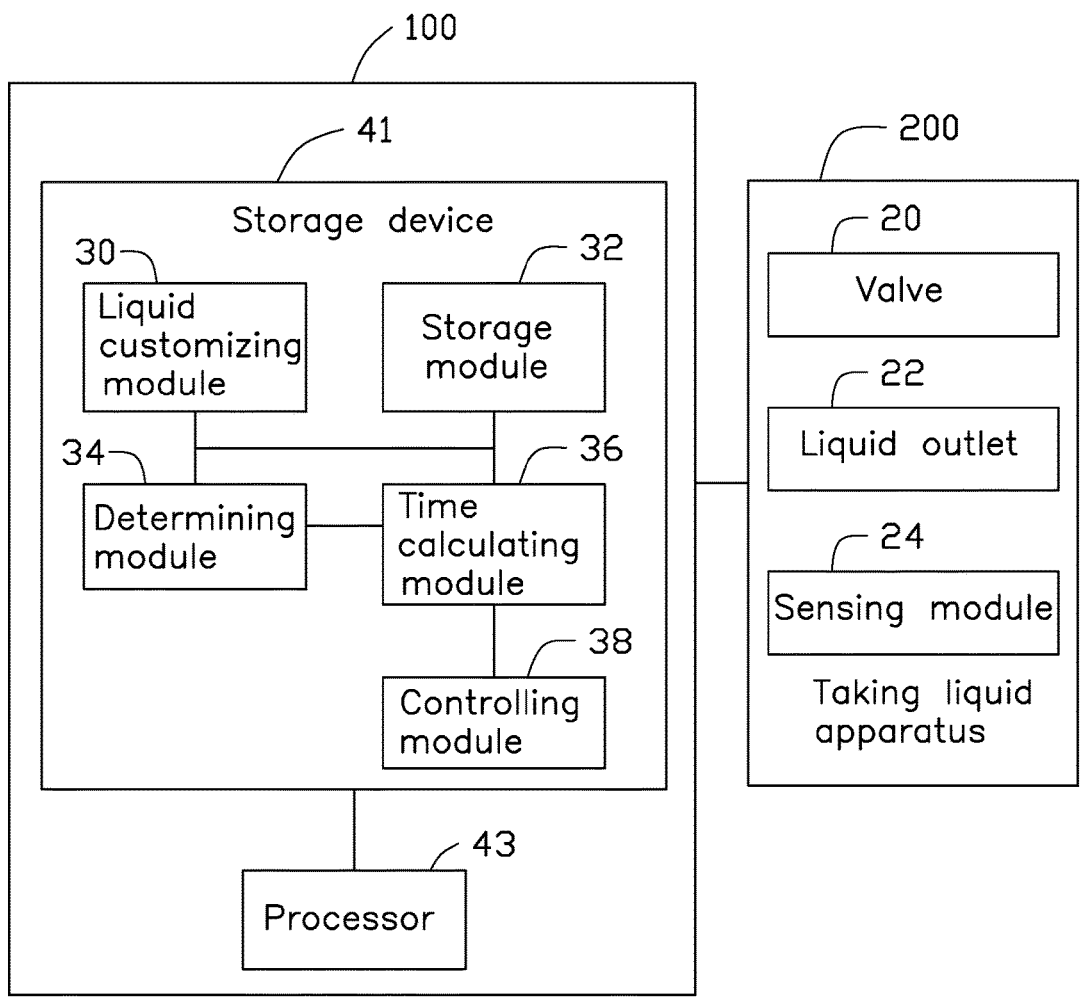
FIG. 4 is a block diagram of an intelligent liquid dispensing system according to a second exemplary embodiment.

The liquid customizing module 30 is configured to input a requirement as to liquid type. The liquid requirement includes the person who desires and receives the liquid (hereinafter "dispensor"). Referring to FIG. 2, according to an exemplary embodiment, the liquid customizing module 30 includes a touch display 31 and a touch identifying module 33. The touch display 31 provides a liquid requirement interface for the dispensor inputting the liquid requirement. The touch identifying module 33 identifies the liquid requirement input by the dispensor. Referring to FIG. 3, according to another exemplary embodiment, the liquid customizing module 30 includes a voice inputting module 35 and a voice identifying module 37. The voice inputting module 35 is configured to allow voice input as a liquid requirement. The voice identifying module 37 identifies the spoken liquid requirement. The liquid customizing module 30 further includes a tip marking the liquid requirement input by a voice. The tip is on a prominent position of the liquid-releasing apparatus 200.

The storage module 32 stores rules as to liquid amount can dispense. According to the liquid requirement and the liquid amount rule, the determining module 34 determines an amount of liquid corresponding to the liquid requirement. In an exemplary embodiment, the liquid-releasing apparatus 200 is a hand sanitizer dispensing apparatus. The liquid requirement includes an age of the user using the hand sanitizer. The liquid amount rules include an amount of the hand sanitizer corresponding to different ages. The liquid requirement further can include heaviness of dirt on the hand. The liquid amount rule includes an amount of the hand sanitizer corresponding to different ages and different degrees of dirt. When the user is younger and the dirty degree is low, the amount of the hand sanitizer is little. In another exemplary embodiment, the liquid-releasing apparatus 200 is a drinking liquid vending machine. The liquid requirement includes an age of a user and an environmental temperature. The liquid amount rule includes an amount for dispensor corresponding to different ages and different environmental temperatures. When the user is younger and the environmental temperature is cold, the amount of the drinking liquid to be dispensed is little.

When a preset condition is met, the controlling module 38 controls the valve 20 to turn on. In an exemplary embodiment, after acquiring the liquid requirement, the controlling module 38 controls the valve 20 to turn on. In another exemplary embodiment, the liquid-releasing apparatus 200 further includes a sensing module 24. The sensing module 24 senses whether an object is positioned under the liquid outlet 22. When there is an object positioned within a preset distance under the liquid outlet 22, the controlling module 38 controls the valve 20 to turn on. The sensing module 24 can be an infrared sensor.

The storage module 32 further stores a flow speed of liquid being ejected out from the liquid outlet 22. According to the flow speed of liquid and the amount of using liquid, the time calculating module 36 calculates a period of time for the liquid to flow. When a flowing time of the liquid reaches the calculated time, the controlling module 28 controls the valve 20 to turn off.

Figure 5:
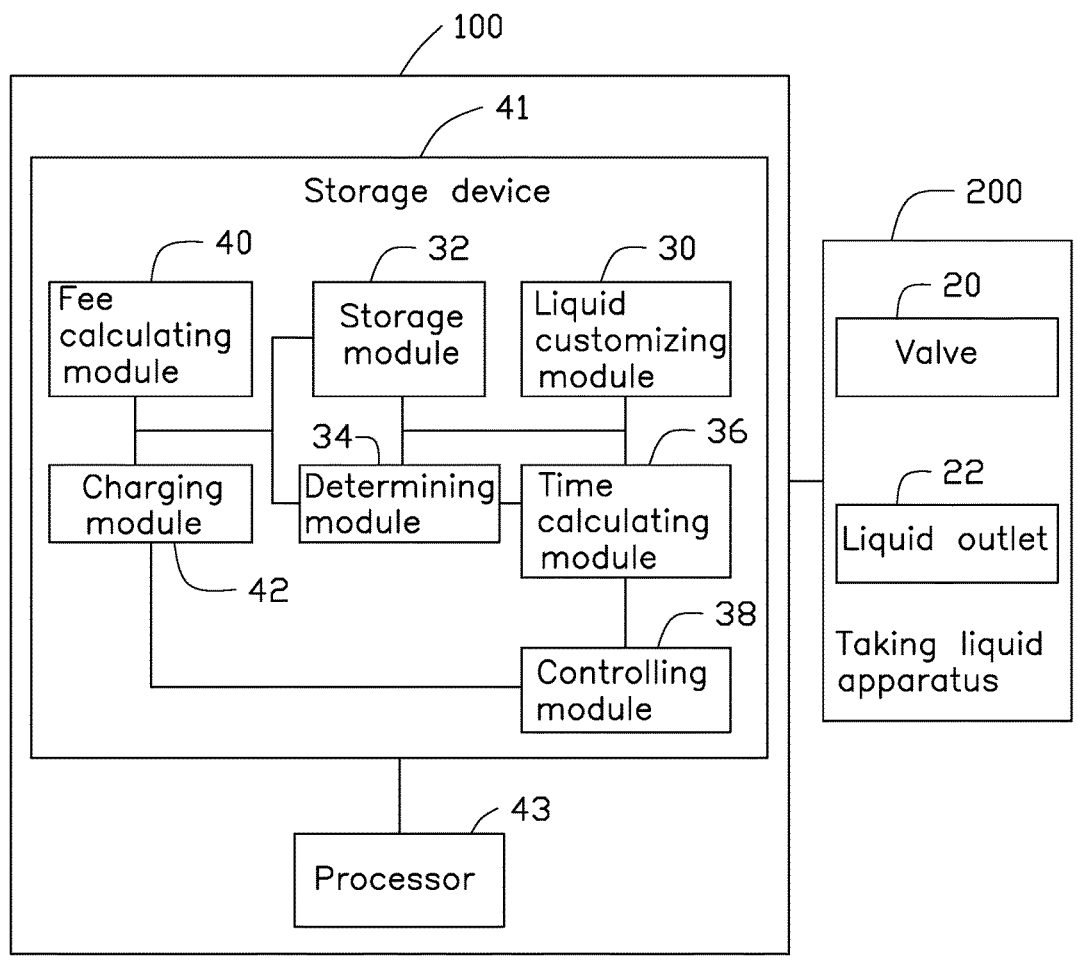
FIG. 5 is a block diagram of an intelligent liquid dispensing system according to a third exemplary embodiment.

Referring to FIG. 5, the intelligent liquid dispensing system 100 further includes a fee calculating module 40 and a charging module 42. The storage module 32 further stores a fee rule. According to the amount of liquid dispensed and the fee rule, the fee calculating module 40 calculates a fee of the amount of liquid dispensed. The charging module 42 provides a charging channel for the dispensor to pay the fee. The charging channel can be WECHAT charging or ALIPAY. The controlling module 28 controls the valve 20 to turn on only after the fee is paid.

Figure 6:
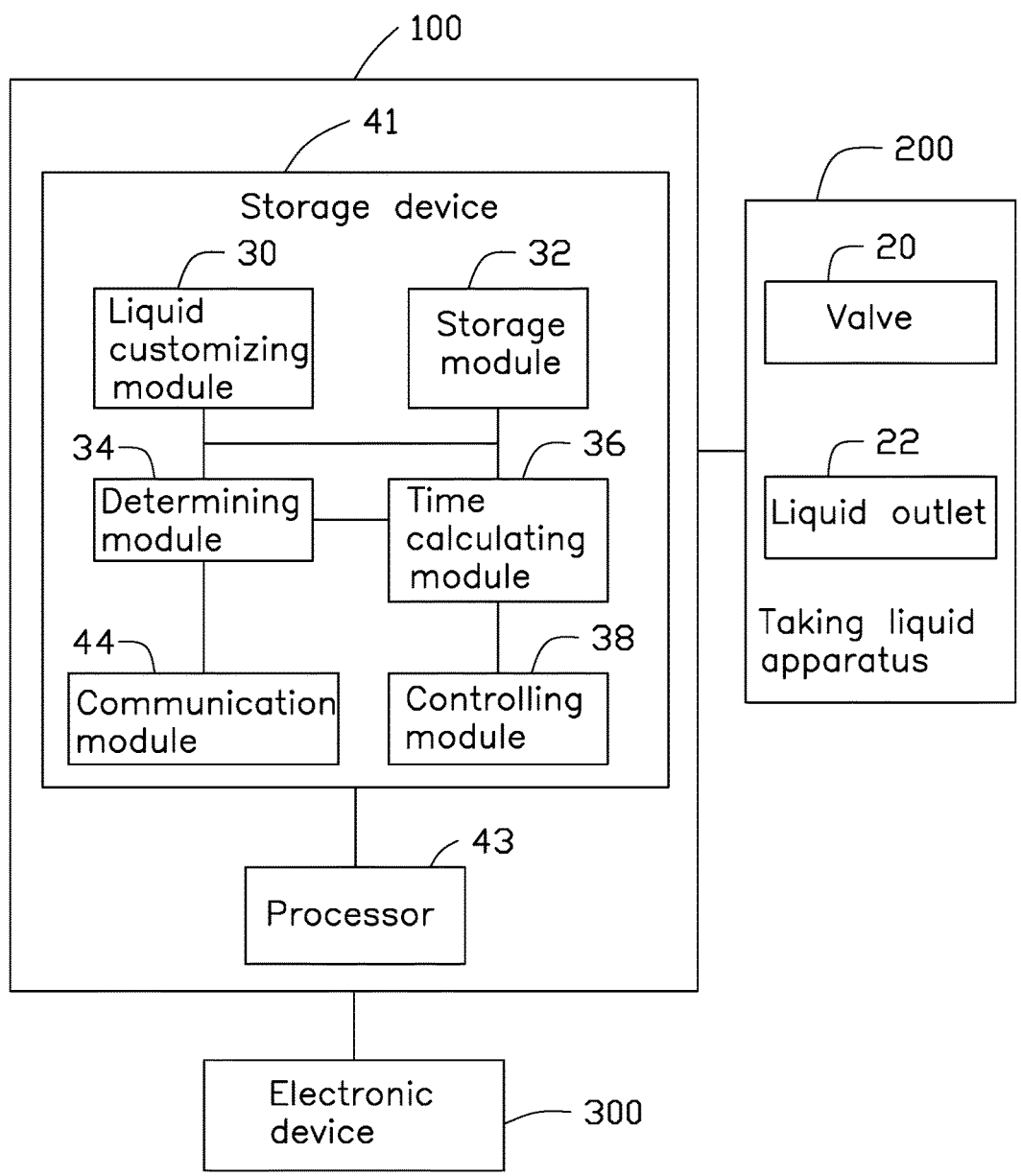
FIG. 6 is a block diagram of an intelligent liquid dispensing system according to a fourth exemplary embodiment.
Figure 7:
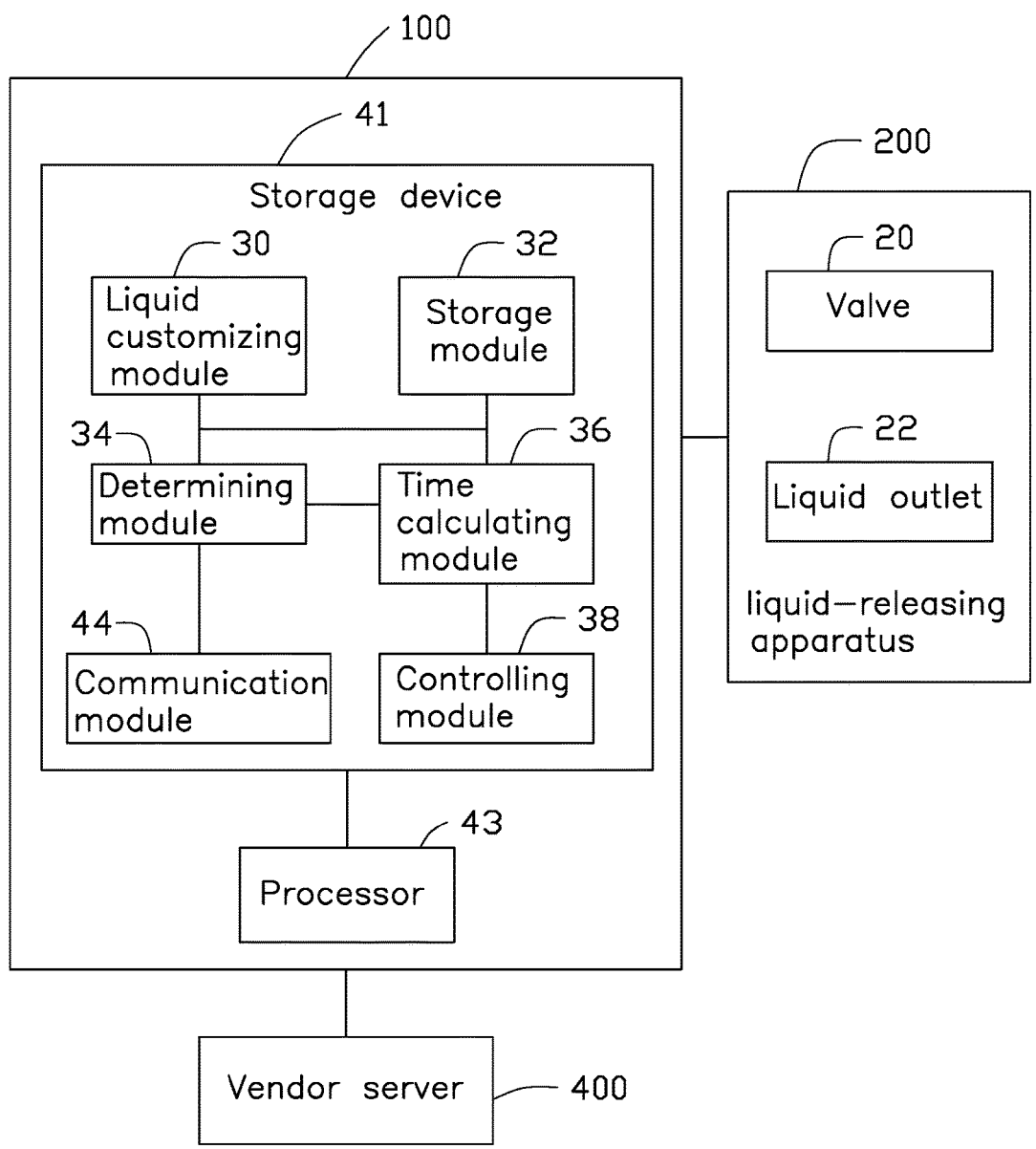
FIG. 7 is a block diagram of an intelligent liquid dispensing system according to a fifth exemplary embodiment.

Referring to FIG. 6, the intelligent liquid dispensing system 100 further includes a communication module 44. The liquid-releasing apparatus 200 is a household apparatus, for example, a kitchen tap. The communication module 44 communicates to an electronic device 300 and transmits the amount of the dispensable or dispensed liquid to the electronic device 300. The electronic device 300 can be mobile phone. Thus, the dispensor can know the amount of liquid taken. Referring to FIG. 7, in another exemplary embodiment, the liquid-releasing apparatus 200 is a drinking liquid vending machine. The communication module 44 communicates to a vendor server 400 of the drinking liquid vending machine. The communication module 44 transmits the amount of the liquid dispensed and a unique identification of the drinking liquid vending machine to the vendor server 400. Thus, the vendor 400 of the drinking liquid vending machine can be informed of each sale of the drinking liquid of each drinking liquid vending machine.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An intelligent liquid dispensing system applying to a liquid-releasing apparatus, the liquid-releasing apparatus comprising a valve and a liquid outlet, the intelligent liquid dispensing system comprising:
    a storage device that stores an amount of liquid according to a rule of use and a flow speed of liquid ejecting out from the liquid outlet and programs, wherein the rule of use for the amount of liquid comprises a relationship between ages of users and amounts of use of liquid; and
    at least one processor, wherein the programs, when executed by the at least one processor, cause the at least one processor to:
    input a liquid requirement, the liquid requirement comprises the age of the user who is inputting the liquid requirement;
    according to the liquid amount using rule, determine the amount of liquid for use corresponding to the liquid requirement;
    according to the flow speed of liquid and the amount of liquid, calculate a time of the liquid flowing; and
    when a preset condition is met, control the valve to turn on, and upon the flow of the liquid at the rated speed reaching the time, control the valve to turn off;
    wherein the storage device further comprises a fee rule, the at least one processor is further caused to, according to the amount of using liquid and the fee rule, calculate a fee of the amount of using liquid, and provide a charging channel for the user paying the fee, when the fee is paid, control the valve to turn on.

2. The intelligent liquid dispensing system as claimed in claim 1, wherein the liquid-releasing apparatus is a household liquid-releasing apparatus, the at least one processor is further caused to communicate to an electronic device and transmits the amount of the using liquid to the electronic device.

3. The intelligent liquid dispensing system as claimed in claim 1, wherein the liquid-releasing apparatus is a drinking liquid vending machine, the at least one processor is further caused to communicate to a vendor server of the drinking liquid vending machine, and transmit the amount of the using liquid and an unique identification of the drinking liquid vending machine to the vendor server.

4. The intelligent liquid dispensing system as claimed in claim 1, wherein after acquiring the liquid requirement a preset time, the controlling module turns the valve on.

5. The intelligent liquid dispensing system as claimed in claim 1, wherein the liquid-releasing apparatus further comprises a sensor, the sensor senses whether an object is positioned within a preset distance under the liquid outlet, and the at least one processor is further caused to, when there is an object positioned the preset distance under the liquid outlet, control the valve to turn on.

6. The intelligent liquid dispensing system as claimed in claim 1, wherein the intelligent liquid dispensing system comprises a touch display, the touch display provides a liquid requirement interface for the user inputting the liquid requirement, the at least one processor is further caused to identify the liquid requirement.

7. The intelligent liquid dispensing system as claimed in claim 1, wherein the at least one processor is further caused to input a liquid requirement voice, and identify the liquid requirement voice.

8. The intelligent liquid dispensing system as claimed in claim 7, wherein the liquid-releasing apparatus is a hand sanitizer dispensing apparatus, the liquid requirement further comprises heaviness of dirt on the hand of the user, the liquid amount rule comprises a relationship between ages of users, degrees of dirt, and amount of using liquid.

9. The intelligent liquid dispensing system as claimed in claim 1, wherein the liquid-releasing apparatus is a drinking liquid vending machine, the liquid requirement further comprises an environment temperature, the liquid amount using rule comprises a relationship between ages of users, environment temperatures and amount of using liquid.

10. A liquid-releasing apparatus comprising:
    a liquid outlet;
    a valve controlling whether liquid flows out of the liquid outlet;
    a storage device that stores an amount of liquid according to a rule of use and a flow speed of liquid ejecting out from the liquid outlet and programs, wherein the rule of use for the amount of liquid comprises a relationship between age of users and amount of liquid for use; and at least one processor, wherein the programs, when executed by the at least one processor, cause the at least one processor to:

input a liquid requirement, the liquid requirement comprises the age of the user who is inputting the liquid requirement;

according to the liquid amount using rule, determine the amount of liquid for use corresponding to the liquid requirement;

according to the flow speed of liquid and the amount of liquid for use, calculate a time of the liquid flowing; and when a preset condition is met, control the valve to turn on, and upon the flow of liquid at the rated speed reaching the time, control the valve to turn off;

the storage device further comprises the storage device further stores a fee rule, the at least one processor is further caused to, according to the amount of using liquid and the fee rule, calculate a fee of the amount of using liquid, and provide a charging channel for the user paying the fee, when the fee is paid, control the valve to turn on.

11. The liquid-releasing apparatus as claimed in claim 10, wherein the liquid-releasing apparatus is a household liquid-releasing apparatus, the at least one processor is further caused to communicate to an electronic device and transmits the amount of the using liquid to the electronic device.

12. The liquid-releasing apparatus as claimed in claim 10, wherein the liquid-releasing apparatus is a drinking liquid vending machine, the at least one processor is further caused to communicate to a vendor server of the drinking liquid vending machine, and transmit the amount of the using liquid and an unique identification of the drinking liquid vending machine to the vendor server.

13. The liquid-releasing apparatus as claimed in claim 10, wherein after acquiring the liquid requirement a preset time, the controlling module turns the valve on.

14. The liquid-releasing apparatus as claimed in claim 10, wherein the liquid-releasing apparatus further comprises a sensor, the sensor senses whether an object is positioned within preset distance under the liquid outlet, the at least one processor is further caused to, when there is an object positioned the preset distance under the liquid outlet, control the valve to turn on.

15. The liquid-releasing apparatus as claimed in claim 10, wherein the liquid-releasing apparatus comprises a touch display, the touch display provides a liquid requirement interface for the user inputting the liquid requirement, the at least one processor is further caused to identify the liquid requirement.

16. The liquid-releasing apparatus as claimed in claim 10, wherein the at least one processor is further caused to input a liquid requirement voice, and identify the liquid requirement voice.

17. The liquid-releasing apparatus as claimed in claim 16, wherein the liquid-releasing apparatus is a hand sanitizer dispensing apparatus, the liquid requirement further comprises heaviness of dirt on the hand of the user, the liquid amount rule comprises a relationship between age of users, degrees of dirt, and amount of using liquid.

18. The liquid-releasing apparatus as claimed in claim 10, wherein the liquid-releasing apparatus is a drinking liquid vending machine, the liquid requirement further comprises an environment temperature, the rule as to amount of liquid comprising a relationship between age of user, environment temperature, and amount of liquid for use.

* * * * *